United States Patent [19]

Cheung et al.

[11] Patent Number: 5,717,538
[45] Date of Patent: Feb. 10, 1998

[54] ASYNCHRONOUS POSITION ERROR SIGNAL DETECTOR EMPLOYING WEIGHTED ACCUMULATION FOR USE IN SERVO SYSTEM

[75] Inventors: Wayne Leung Cheung, San Jose; Kok-Kia Chew, Fremont; Ju-Hi John Hong, San Jose, all of Calif.

[73] Assignee: International Business Machines Corporation, Armonk, N.Y.

[21] Appl. No.: 376,962

[22] Filed: Jan. 20, 1995

[51] Int. Cl.$^6$ .................................................. G11B 5/596
[52] U.S. Cl. ............................. 360/77.08; 360/77.02
[58] Field of Search .................................. 360/67, 77.02, 360/77.05, 77.08

[56] References Cited

U.S. PATENT DOCUMENTS

| | | | |
|---|---|---|---|
| 4,551,776 | 11/1985 | Roalson | 360/77.02 |
| 4,616,276 | 10/1986 | Workman . | |
| 4,669,004 | 5/1987 | Moon et al. . | |
| 4,823,212 | 4/1989 | Knowles et al. . | |
| 4,977,472 | 12/1990 | Volz et al. . | |

(List continued on next page.)

FOREIGN PATENT DOCUMENTS 91-280275  12/1991  Japan .

OTHER PUBLICATIONS

Jacob Millman, Ph.D. and Arvin Grabel, Sc.D., "Microelectronics" 2nd Ed., 1987, pp. 760–762.
Herrington and Mueller, "Quad–Burst Servo Pattern", *IBM Technical Disclosure Bulletin*, vol. 21, No. 2, Jul. 1978.
Best and Hetzler, "Servo Scheme For Integrating Positive Error Signal Detector", *IBM Technical Disclosure Bulletin*, vol. 32, No. 1 (Jun., 1989).

(List continued on next page.)

*Primary Examiner*—Thang V. Tran
*Assistant Examiner*—James L. Habermehl
*Attorney, Agent, or Firm*—Baker, Maxham, Jester & Meador

[57] ABSTRACT

A servo system accurately detects and processes signals from servo patterns encoded on magnetic storage disks using weighted accumulation, for use in precisely positioning read/write heads with respect to tracks of data contained on the disks. After servo patterns are sensed by reading them from a disk, the resultant servo signals are processed by weighted accumulation circuitry to provide a position signal, which may be decoded to ascertain the positioning error of the read/write head and to apply any corrections that might be needed. In one embodiment, an amplitude position signal is generated by multiplying the servo signal by complementary quadrature weighting signals, then squaring each quadrature output signal, summing them, and taking the square root of the summed signal. In another embodiment, a phase position signal is generated by multiplying the servo signal by complementary quadrature weighting signals, dividing one of the multiplied signals by the other to provide a quotient signal, and then generating a signal corresponding to the arctangent of the quotient signal. The invention may be implemented with analog or digital circuitry. In an analog embodiment, the quadrature output signals are created using multipliers to multiply the servo signal by complementary analog quadrature weighting signals. In a digital embodiment, the output quadrature signals are created using latches to sample the servo signal at predetermined intervals, selectively multiplying sampled signals by predetermined quadrature weighting signals, and accumulating the resulting signals.

31 Claims, 12 Drawing Sheets

U.S. PATENT DOCUMENTS

| | | | |
|---|---|---|---|
| 5,050,016 | 9/1991 | Squires. | |
| 5,089,757 | 2/1992 | Wilson. | |
| 5,115,359 | 5/1992 | Sidman. | |
| 5,177,651 | 1/1993 | Moraru et al.. | |
| 5,321,559 | 6/1994 | Nguyen et al. | 360/46 |
| 5,343,340 | 8/1994 | Boutaghou et al. | 360/77.08 |
| 5,345,342 | 9/1994 | Abbott et al. | 360/77.08 X |
| 5,442,498 | 8/1995 | Cheung et al. | 360/77.08 |

OTHER PUBLICATIONS

Liu, "Quad–Burst Servo Pattern", *IBM Technical Disclosure Bulletin*, vol. 22, No. 12 (May, 1980).

Raghavan, "Fast and Accurate Computation of the Amplitude of Quadrature Pairs", *IBM Technical Disclosure Bulletin*, vol. 34, No. 4B (Sep., 1991).

Freitas, Herbst and Moser, "Asynchronous Quadrature Burst Position Error Demodulation Technique", *IBM Technical Disclosure Bulletin*, vol. 34, No. 5 (Oct., 1991).

$LC^2MOS$ Complete Embedded Servo Front Ends for HDD AD7773/AD7775.

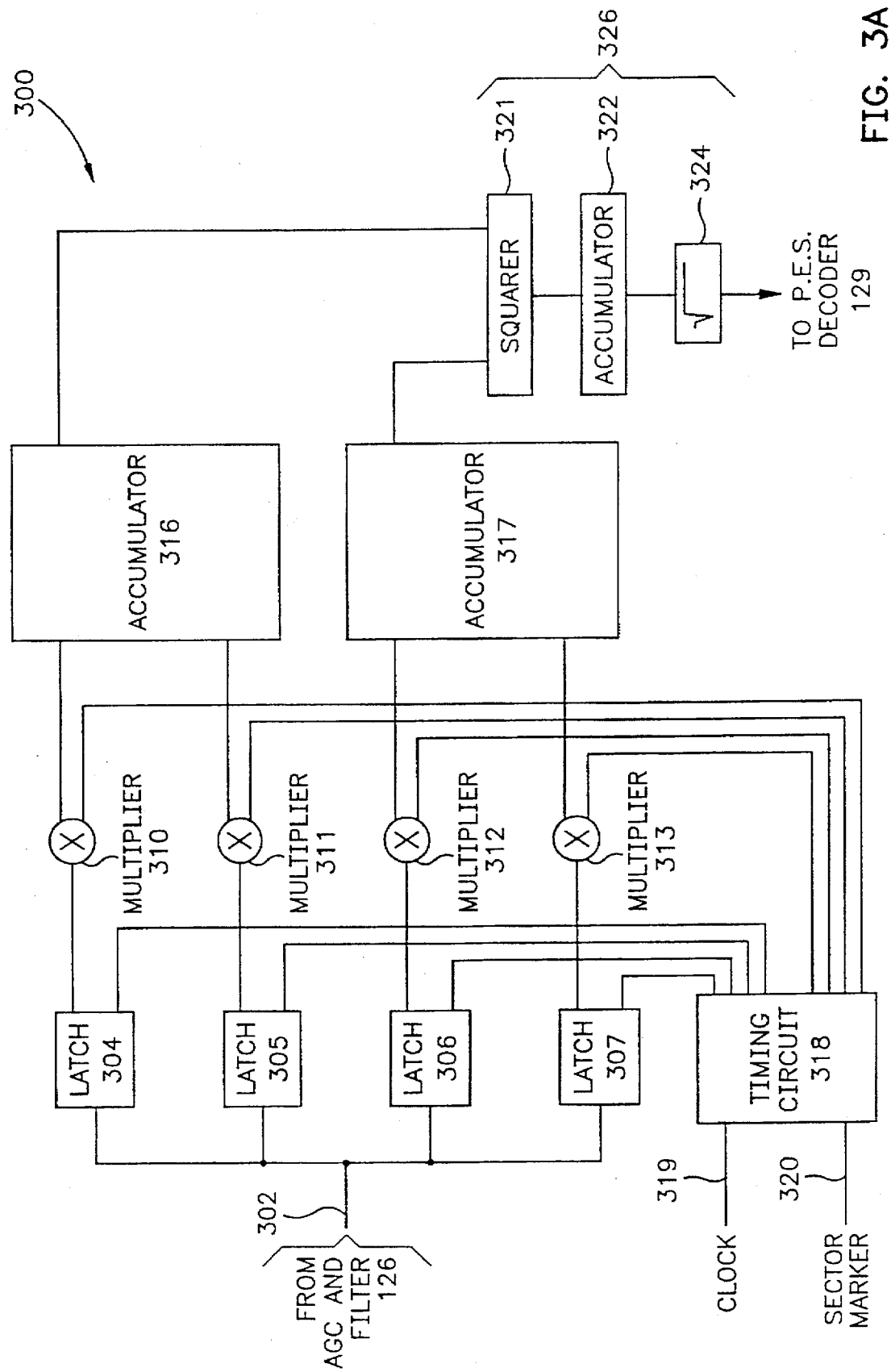

ASYNCHRONOUS POSITION ERROR SIGNAL DETECTOR EMPLOYING WEIGHTED ACCUMULATION FOR USE IN SERVO SYSTEM

BACKGROUND OF THE INVENTION

1. Field of the Invention

The present invention relates to servos for rigid disk magnetic recording systems. More particularly, the invention concerns a method and apparatus for asynchronously processing servo signals for use in accessing data on selected tracks of a rigid magnetic data storage disk. In accordance with the invention, this processing is performed using weighted accumulation.

2. Description of the Related Art

Positioning read/write heads is one of the most critical aspects of storing and retrieving data in magnetic disk storage systems. With the very high track density of modern disk drives, even the smallest head positioning error can potentially cause a loss of customer data to be stored or retrieved from a disk drive. Accordingly, engineers have focused a great deal of attention on systems for precisely positioning read/write heads on tracks where data is to be stored or read. These positioning systems, called "servo" systems, typically operate by reading position-encoded data contained on the disks, and using a closed loop control system to position one or more read/write heads accordingly. In a servo system using position error signal bursts, for example, the position-encoded data generally comprises periodic analog servo burst patterns ("bursts") that are written into concentric stripes on the surface of a disk.

Two types of servo systems generally predominate in today's rigid disk drive systems. First, with the "dedicated surface" variety, one surface of one disk is used exclusively to store read-only servo data. The chief advantage of the dedicated surface approach is that it develops a constant stream of position information, since a dedicated read/write head continuously reads servo patterns from the dedicated disk surface. Accordingly, servo information is continuously available for positioning. This system is inefficient in another respect, however, since duplicated circuitry is required to process both the servo signals (read from the dedicated disk surface) and the data signals (read from other disk surfaces).

The second type of popular servo arrangement is the "sector servo" or "embedded servo" system. In this system, track position information is interspersed with customer data on each track, in the following way. Each track is divided into multiple sectors, which in turn are subdivided into multiple fields including a field for track position information, a field for track number identification, a field for read/write data, and other fields as needed. The beginning of each sector is typically indicated by a "sector marker". A primary advantage of the sector servo system is that it is efficient in terms of circuitry, since common circuitry can be used to process data signals received from the servo sector and the data sector.

There are two problems that can plague both the sector servo and the dedicated surface systems: noise and synchronization. Noise can be introduced into servo systems by manufacturing imperfections in the head, imperfections of the disk media, foreign matter on the disk media, mechanical noise produced by movement of the actuator arm, and various sources of electrical noise. This noise, for example, can include random "white noise", as well as different harmonic frequencies that result from the sources mentioned above. In extreme cases, such noise can prevent the servo system from accurately determining the position of the read/write head. Although some inductive heads have been known to produce significant noise under some circumstances, the mechanical structure of magnetoresistive ("MR") heads makes them more likely to produce an irregular servo signal that includes harmonic frequencies and other types of noise. Moreover, these problems can be intensified by the extremely high track density that is present in many compact hard drives.

Synchronization is another potential problem with servo systems. This problem arises in sector servo systems because the head must be re-synchronized with servo data each time the head approaches a different sector of the rapidly spinning disk. Synchronization is also required in dedicated servo systems when the head moves to a different track. In a burst positioning system, synchronization involves determining precisely where the bursts in a servo sector begin. The chief synchronization problem results from the difficulty in employing electronic circuitry to speedily and accurately recognize the beginning of a servo burst. Another problem is that, in some cases, the bursts themselves may contain some discrepancies, possibly resulting in a mistaken position determination. Also, phase jitter noise from fundamental and harmonic frequencies can make it difficult to correctly identify the start of servo data.

The problems of noise and synchronization, described above, have been approached with analog as well as digital solutions. Typical of the analog solution is the Analog Devices "LC$^2$MOS Complete Embedded Servo Front Ends for HDD", embodied in circuit models AD7773 and AD7775, and U.S. Pat. No. 4,990,916. Although the Analog Devices approach may be adequate for many applications, it is not completely satisfactory under certain conditions. For example, the accuracy of the Analog Devices system may be unreliable when harmonic noise exceeds certain thresholds. Also, synchronization may be difficult to precisely achieve with the Analog Devices circuit, since it is based upon zero crossings of the servo signal.

In addition to analog servo systems, a number of digital systems have been constructed to address the noise and synchronization problems. Some successful digital systems have been developed, for example, that use digital signal processors to implement position error circuitry. These processors typically attack the synchronization and noise problems with computation-intensive algorithms, which may require more circuit complexity, processing time, power consumption, and expense than some users might like.

Another type of servo system is the rectification servo, which may be implemented with analog or digital circuitry. The rectification servo operates by rectifying the sensed servo signal using a full wave or half wave rectifier, and then filtering the rectified signal. Although this system may be satisfactory in some contexts, it suffers from the same limitations of noise and synchronization discussed above.

Accordingly, a system is needed to provide increased accuracy and flexibility in detecting servo patterns and processing servo signals in a servo system for rigid magnetic data storage disks.

SUMMARY OF THE INVENTION

The present invention concerns a system for accurately detecting servo patterns encoded on rigid magnetic storage disks and processing the resultant servo signals to more precisely position the read/write head on a desired track of such disks. In a general sense, the invention first senses a servo pattern by reading it from a disk, then processes the sensed servo signals with weighted accumulation circuitry and demodulator circuitry to derive a position signal.

In an illustrative embodiment, the invention utilizes analog circuitry to implement weighted accumulation and demodulation functions. After a servo pattern is sensed and amplified, multipliers multiply the resultant servo signal by complementary weighting signals to yield quadrature output signals. Then, A.C. cancellation circuits remove any A.C. components from the quadrature signals. In one embodiment, each of the resulting signals is squared by a squarer, and the squared signals are summed by an accumulator. A square root circuit then takes the square root of the summed signal, to provide an amplitude position signal. In another embodiment, one of the resulting signals is divided by the other to yield a quotient signal, and a phase position signal is produced by generating a signal corresponding to the arctangent of the quotient signal. The amplitude or phase position signal may be further processed by a decoder to determine whether the read/write head is positioned accurately with respect to the desired track, and then used by a servo controller to generate any corrective signals that might be needed.

Another embodiment of the invention utilizes digital circuitry to implement weighted accumulation and demodulation functions. Specifically, complementary quadrature signals are generated by using latches to sample the servo signal at predetermined intervals, and then using multipliers to multiply each sampled signal by one of a predetermined set of weighting signals. An accumulator provides complementary quadrature output signals by selectively summing signals from the multipliers. The quadrature output signals are then processed by demodulator circuitry to provide amplitude or phase position signals. The amplitude or phase position signal may be further processed by decoding circuitry to determine whether the read/write head is positioned accurately with respect to the desired track, and then used by a servo controller to generate any corrective signals that might be needed.

A different aspect of the invention provides a method for precisely accessing data stored on magnetic storage disks by accurately detecting and processing servo patterns encoded on such disks.

The invention affords its users with a number of distinct advantages. First, in comparison to prior detectors, the invention provides an improved servo detector with reduced power consumption, since many components of the invention may be shared between a servo channel and a data channel. Moreover, the servo detector of the invention is efficient in terms of circuit use, and may be implemented with a minimum of space. Additionally, the invention can easily synchronize itself to servo patterns despite presence of phase jitters and other noise. The invention also provides a position signal that contains significantly less noise than signals of previous arrangements.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIGS. 3A–3B are block diagrams illustrating the hardware components and electrical interconnections of digital implementations of the PES detector 128, in accordance with the invention;

DETAILED DESCRIPTION OF THE PREFERRED EMBODIMENTS

Structure

1. GENERAL ENVIRONMENT

Figure 1A:
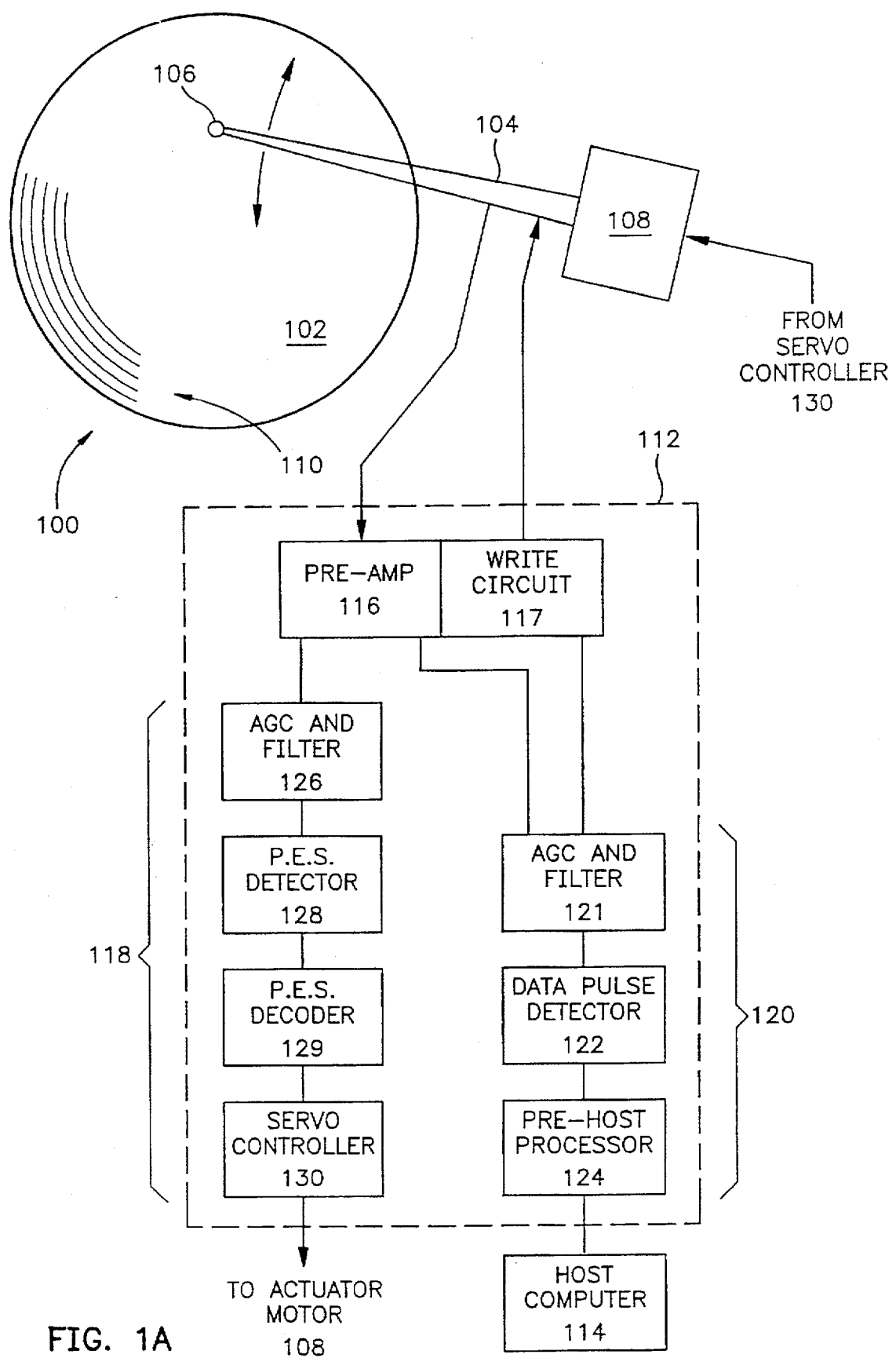
FIG. 1A is a block diagram depicting the environment in which the present invention is generally implemented.

The apparatus of the present invention is generally implemented in conjunction with a magnetic disk drive 100, in an arrangement such as that depicted by FIG. 1A. The disk drive 100 may include one or more individual disks 102 for storing magnetically encoded information. For ease of explanation, however, only one disk 102 is illustrated in FIG. 1A. The disk drive 100 also includes an actuator 104 with a read/write head 106. The position of the actuator 104 is controlled by an actuator motor 108, which pivots the actuator 104, thereby changing the position of the read/write head 106 with respect to concentric tracks 110 of data contained on the disk 102. Although rotary movement of the actuator 104 is depicted for illustrative purposes, the disk drive 100 may alternatively use another positioning scheme, such as linear extension/retraction of the actuator 104.

The operation of the disk drive 100 is managed by a disk drive controller 112, which also serves as an interface between the disk drive 100 and a host computer 114. The host computer 114 may comprise, for example, a desktop personal computer, a notebook computer, a mainframe computer, or another digital processing device for which storage of data on a hard disk is desired.

The controller 112 includes a pre-amplifier 116 ("pre-amp"), which receives electrical representations of servo patterns sensed by the read/write head 106. With sector servo positioning, the pre-amp 116 serves a dual purpose by amplifying either data or servo signals, depending on whether the read/write head 106 is positioned over stored customer data or servo patterns, respectively. A write circuit 117 is also provided to supply the read/write head 106 with data signals to be written to the disk 102. As an alternative to the sector servo arrangement illustrated in FIG. 1A, the read/write head 106 may be used to sample servo signals from a dedicated servo surface. Although the present invention contemplates both sector servo and dedicated surface embodiments, the sector servo embodiment of the invention will be described herein for consistency and ease of explanation.

The amplified signal from the pre-amp 116 is directed to two processing channels: a servo channel 118 and a data channel 120. The write circuit 117 is connected only to the data channel 120. The data channel 120 generally reads and writes data to and from the disk 102, in response to requests of the host 114 to read or write the data. When operating in conjunction with the data channel 120, the pre-amp 116 amplifies signals provided by the read/write head 106 that correspond to customer data stored on the disk 102. Amplified data signals from the pre-amp 116 are then directed to an automatic gain control and filter circuit 121. Then, a data pulse detector 122 forms digital data pulses corresponding to the analog signals provided by the circuit 121. Next, the pre-host processor 124 converts the data pulses into formatted data strings that are specifically compatible with the host computer 114. The components of the data channel 120 also operate in reverse order to write data to the disk 102.

In contrast to the data channel 120, the servo channel 118 generally functions to read servo data from the disk 102 to aid in properly positioning the read/write head 106. When operating in conjunction with the servo channel 118, the pre-amp 116 amplifies servo signals produced when the read/write head 106 senses servo patterns. The servo channel 118 includes an automatic gain control and filter circuit 126 ("AGC/filter"), which may comprise any one of various known circuits for automatically adjusting gain and filtering an input signal. Next, a position error signal ("PES") detector 128 interprets the signal provided by the AGC/filter 126 to provide a position signal, which is related to the position of the read/write head 106 with respect to the desired track's center. The position signal is further processed by a PES decoder 129 to yield a position error signal, indicative of the read/write head's positioning error. This signal is then used by a servo controller 130 to generate an input signal that, when fed to the actuator 104, controls the position of the read/write head 106. The actuator motor 108 may, in an exemplary embodiment, comprise a voice coil motor.

Figure 1B:
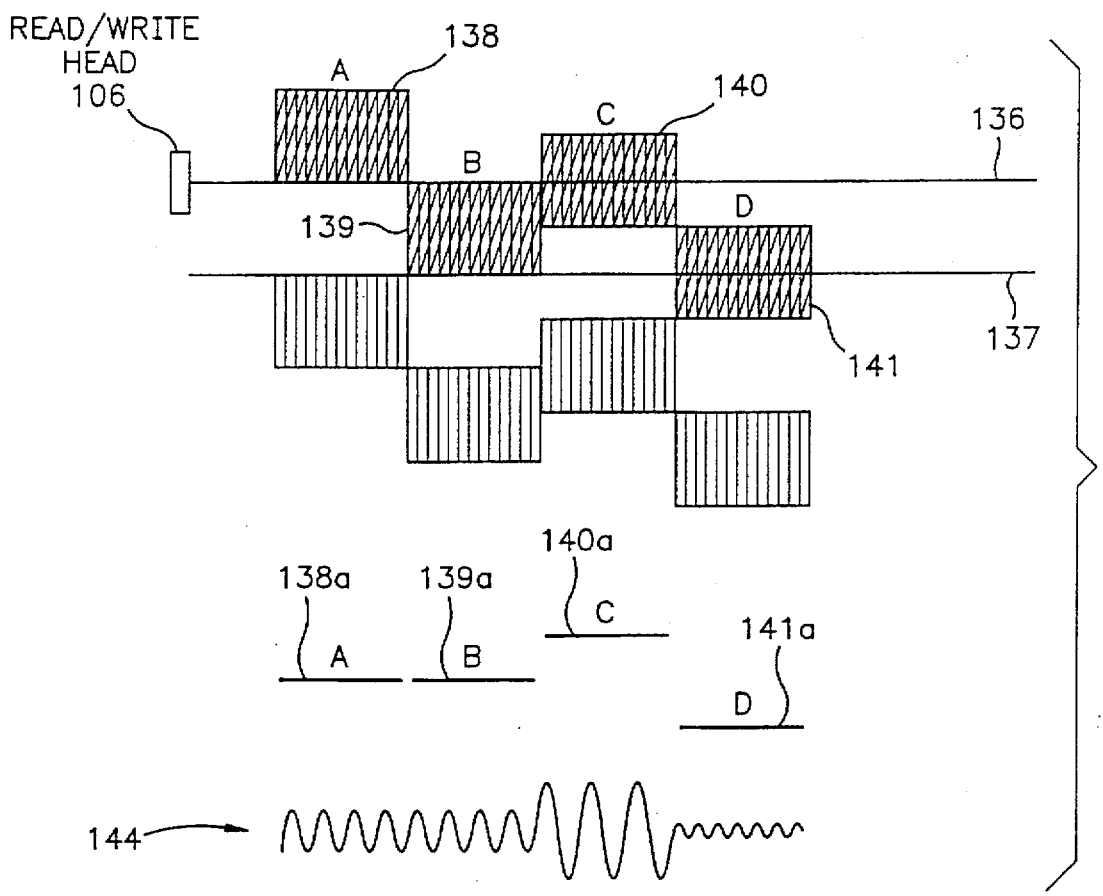
FIG. 1B is a diagram illustrating an amplitude servo pattern along with corresponding position signals.

FIG. 1B illustrates, in greater detail, the use and processing of amplitude servo signals to accurately position the read/write head 106 about a track 136 or a track 137. Proximate the tracks 136–137, the disk surface has encoded thereon various servo pattern bursts 138–141. Each burst 138–140 is sensed and processed to provide servo signals that guide the read/write head 106 along one of the tracks 136–137. Although the bursts 138–139 most directly serve to guide the read/write head 106 in following the track 136, these bursts 138–139 also provide position information useful in guiding head 106 along more remote tracks, such as the track 137.

Figure 1C:
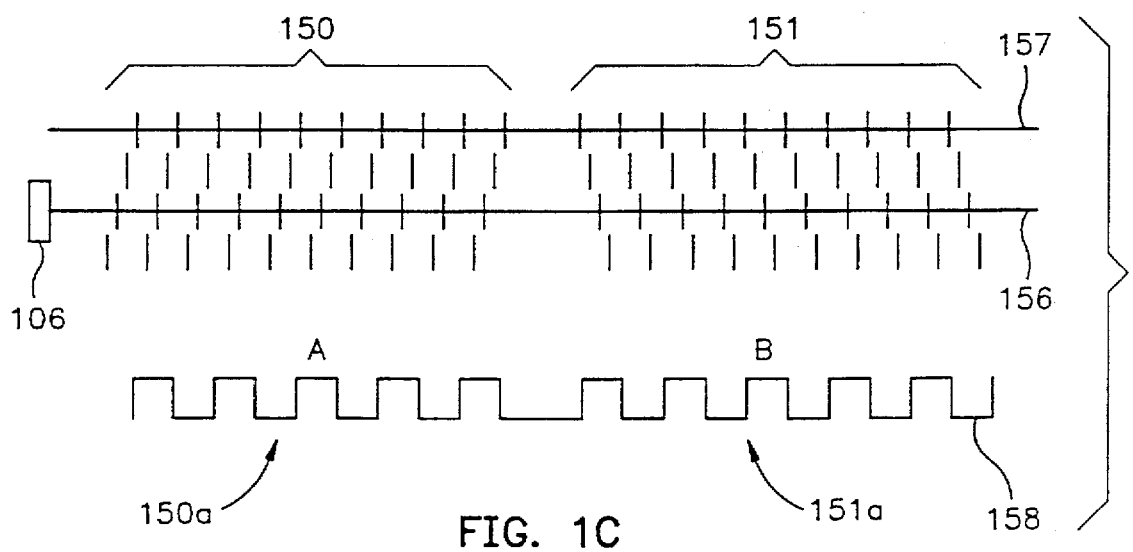
FIG. 1C is a diagram illustrating a phase servo pattern along with corresponding position signals.

In accordance with one embodiment of the invention, amplitude type bursts are sensed and amplified to yield servo signals 144 that correspond to the read/write head's position. The servo signals 144 may be further processed to provide a series of amplitude position signals 138a–141a corresponding to the bursts 138–141. In another embodiment (FIG. 1C), phase type bursts 150–151 are used to position the read/write head 106 about a track 156 or a track 157. As with the amplitude bursts 138–141 (FIG. 1B), the phase bursts 150–151 are sensed and amplified for use in guiding the read/write head 154 along one of the tracks 156–157. In accordance with the invention, the phase type bursts 150–151 are sensed and amplified to yield servo signals 158 that correspond to the read/write head's position. The servo signals 158 comprise a series of intervals 150a–151a corresponding to the bursts 150–151. As described in greater detail below, the servo signals 158 may be further processed to provide phase position signals (not shown) corresponding to the bursts 150–151.

2. ANALOG IMPLEMENTATION

Figure 2A:
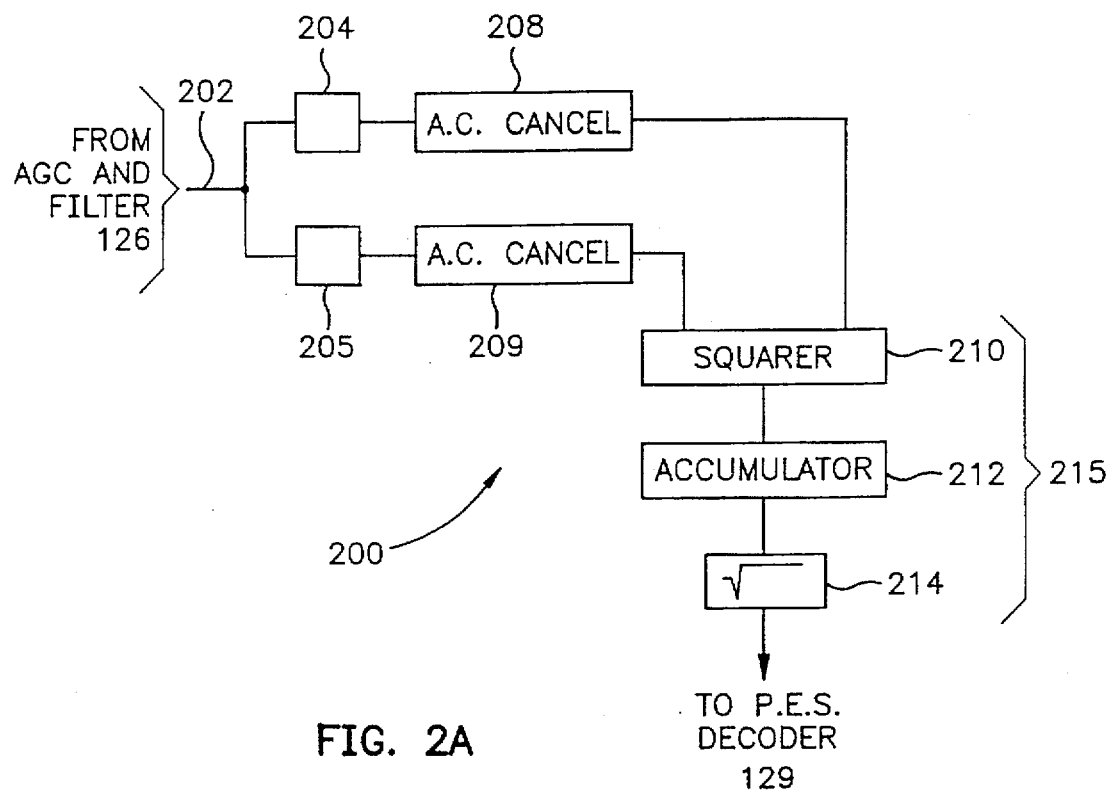
FIGS. 2A–2B are block diagrams illustrating the hardware components and electrical interconnections of analog implementations of a PES detector 128, in accordance with the invention.

One implementation of the PES detector 128 of the invention comprises an analog PES detector 200 that generates an amplitude position signal (FIG. 2A). In this embodiment, the output signal of the AGC/filter 126 is provided to an input line 202, which is directed to a pair of multipliers 204–205. The multipliers 204–205 multiply the input signal on the input line 202 by first and second weighting signals, which preferably comprise complementary quadrature weighting signals, to generate respective quadrature output signals at their outputs. Next, A.C. cancellation circuits 208–209 cancel any A.C. signals present in the quadrature output signals generated by the multipliers 204–205. For purposes of the present invention, "A.C." includes alternating current, harmonic frequencies, and other periodic signals. The A.C.-cancelled signals are then processed by a demodulator 215, as follows. First, each of the A.C.-cancelled signals is squared by a squarer 210. Next, the squared signals are summed by an accumulator 212, and the square root of the summed signal is provided by a square root circuit 214. This final signal represents an amplitude position signal, which corresponds to the position of the read/write head 106 in relation to the relevant track's center. The amplitude position signal is further processed by the PES decoder 129 to ascertain the positioning error of the read/write head 106. The servo controller 130 then generates any corrective signals needed to re-position the read/write head 106, and the controller 130 directs these signals to the motor 108.

An illustrative construction of the analog PES detector 200 may be implemented using discrete circuit components, BIFET integrated circuits, CMOSFET integrated circuits, or an application specific integrated circuit. In an illustrative embodiment of the invention, the A.C. cancellation circuits 208–209 may comprise integrators. The squarer 210 and the square root circuit 214 are preferably implemented using nonlinear semiconductors, such as diodes or field effect transistors.

For illustrative purposes, the input signal 202 may be represented by Equation 1, which illustrates a fundamental portion of an exemplary servo signal:

$$\text{INPUT SIGNAL} = A \cos(t+\theta) \qquad [1]$$

where:

A = the amplitude of the servo signal;
t = time, which varies; and
θ = a constant value of phase.

The first and second weighting signals applied by the multipliers 204–205 preferably comprise quadrature signals which may, in the illustrated embodiment, be represented by sine and cosine signals, as shown in Equations 2–3, respectively:

$$\text{FIRST WEIGHTING SIGNAL} = 2K \sin(t) \quad [2]$$

$$\text{SECOND WEIGHTING SIGNAL} = 2K \cos(t) \quad [3]$$

where: K = some constant scaling factor.

Thus, the multipliers 204–205 provide quadrature output signals according to Equations 4–5:

$$\text{FIRST QUADRATURE OUTPUT SIGNAL} = -KA \sin(\theta) + KA \sin(2t+\theta) \quad [4]$$

$$\text{SECOND QUADRATURE OUTPUT SIGNAL} = KA \cos(2t+\theta) + KA \cos(\theta) \quad [5]$$

By cancelling the A.C. components, the A.C. cancellation circuits 208–209 yield signals described by Equations 6–7:

$$\text{FIRST A.C.-CANCELLED SIGNAL} = -KA \sin(\theta) \quad [6]$$

$$\text{SECOND A.C.-CANCELLED SIGNAL} = KA \cos(\theta) \quad [7]$$

Squaring these signals, adding them, and taking the square root provides an amplitude position signal, described by Equation 8:

$$\text{AMPLITUDE POSITION SIGNAL} = [-KA \sin(\theta)]^2)^{1/2} = KA \quad [8]$$

Figure 2B:
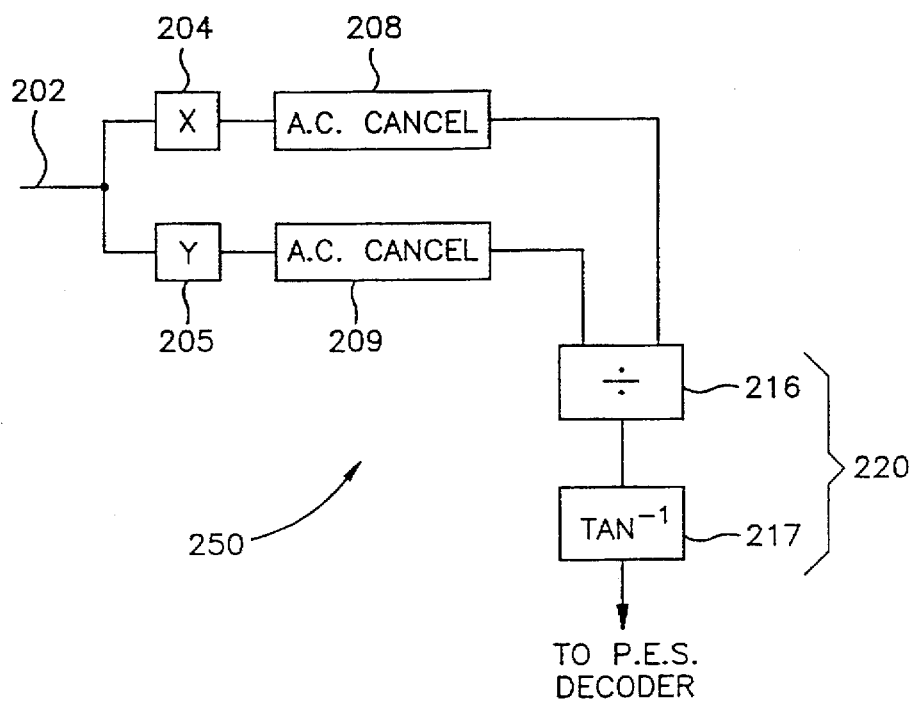

As an alternative to the PES detector 200 of FIG. 2A, the PES detector 128 may comprise an analog phase PES detector 250 (FIG. 2B) to generate a phase position signal. In this embodiment, the demodulator 215 are replaced with a demodulator 220 that includes divider 216 and an arctangent generator 217. As stated above, the outputs of the A.C. cancellation circuits 208–209 are shown by Equations 6–7:

$$\text{FIRST A.C.-CANCELLED SIGNAL} = -KA \sin(\theta) \quad [6]$$

$$\text{SECOND A.C.-CANCELLED SIGNAL} = KA \cos(\theta) \quad [7]$$

Using the divider 216 to divide the signal of Equation 6 by the signal of Equation 7 gives a quotient signal, described by Equation 9:

$$\text{QUOTIENT SIGNAL} = -\sin(\theta)/\cos(\theta) \quad [9]$$

The quotient signal is directed to the arctangent generator 217, which provides a phase position signal according to Equation 10:

$$\text{PHASE POSITION SIGNAL} = \tan^{-1}(\theta) \quad [10]$$

3. DIGITAL IMPLEMENTATION

The invention also contemplates an implementation of the PES detector 128 using digital circuitry. In this embodiment, an analog-to-digital converter ("ADC") (not shown) is used to convert analog signals generated by the read/write head 106 into digital signals. In an illustrative embodiment, the ADC is included with the AGC/filter 126, such that the AGC/filter provides a digital output signal. As shown in FIG. 3A, the invention also includes a digital PES detector 300 to provide an amplitude position signal. In this embodiment, the digital output signal of the AGC/filter 126 is provided to an input line 302, where latches 304–307 sample the input signal at selected intervals. The latches 304–307 may comprise, for example, D type flip-flops. Multipliers 310–313 multiply the signals sampled by the latches 304–307 by weighting signals, which are preferably selected to implement two complementary quadrature signals, as described in greater detail below. The multipliers 310–313 may also comprise D type flip-flops arranged to provide various shifters and inverters, as discussed below. An accumulator 316 sums the signals provided by the multipliers 310–311, and an accumulator 317 sums the signals provided by the multipliers 312–313. The multipliers 310–313 are preferably selected so that the two accumulators 316–317 provide first and second complementary quadrature output signals. These output signals are directed to a squarer 321, an accumulator 322, and square root circuitry 324, which comprise digital counterparts of the corresponding components described in FIG. 2A. The resultant signal, an amplitude position signal, is directed to the PES decoder 129 for further processing as described above.

Figure 4:
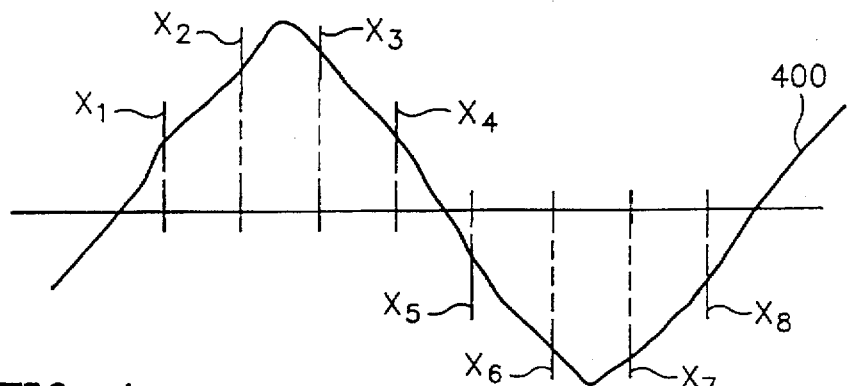
FIG. 4 is a graph depicting the sampling of a servo signal in accordance with a digital implementation of the invention.

When harmonic noise is present, the signal on the input line 302 may appear as shown by the signal 400 in FIG. 4. In an exemplary embodiment, the input signal 400 may be sampled at eight evenly-spaced increments during each complete cycle of input signal. This yields samples x1 through x8, which may be taken as shown in FIG. 4. One advantage of the invention, as explained more fully below, is that the sampling sequence does not have to be started at any particular time respective to special events such as "zero crossings." Therefore, the samples x1 through x8 may be taken at different times than those shown in FIG. 4, without affecting the operation of the invention, as long as they are evenly spaced over the entire period of the input signal 400.

Equations 11–12 (below) depict an exemplary scheme to perform weighted accumulation in accordance with the invention, to generate the first and second amplitude quadrature output signals. As shown by Equations 11–12, the output signals are formed by multiplying selected intervals of the input signal by certain quadrature weighting signals, such as +1, −1, +0.5, and −0.5.

$$\text{FIRST AMPLITUDE QUADRATURE OUTPUT SIGNAL} = x1 - x2 - 0.5x1 + x4 + x5 + x6 + 0.5x5 - x8 \quad [11]$$

$$\text{SECOND AMPLITUDE QUADRATURE OUTPUT SIGNAL} = x2 + x3 + x4 + 0.5x3 - x6 - x7 - x8 - 0.5x7 \quad [12]$$

The first output signal is produced by the latches 304–305, the multipliers 310–311, and the accumulator 316. Likewise, the second output signal is produced by the latches 306–307, the multipliers 312–313, and the accumulator 317. Under the weighted accumulation scheme of Equation 11, each of the latches 304–305 samples the input signal at prescribed times. Specifically, each latch 304–305 stores samples of the input signal that are to be multiplied by the multipliers 310–311 associated with that latch 304–305. In the embodiment illustrated by Equation 11, for example, the multiplier 310 may be implemented to multiply by quadrature weighting signals of +1 and −1, and the multiplier 311 to multiply by quadrature weighting signals of +0.5 and −0.5. In this embodiment, the latch 304 will sample the intervals x1, x2, x4, x5, x6, and x8, since those sample signals must be multiplied by a weighting signals of +1 or −1. The latch 305, on the other hand, samples the intervals x1 and x5, since those sample signals must be multiplied by weighting signals of +0.5 or −0.5.

These multiplication operations are easily performed with digital circuitry, since multiplication by weighting signals of +1, −1, +0.5, and −0.5 can easily be performed upon binary numbers by inverting, shifting, and combinations thereof, as is well-known in the art. In the illustrated embodiment, the multiplier 310 may comprise a selectively activated inverter, and the multiplier 311 may comprise a selectively activated shifter-inverter combination. The accumulator 316 simply sums the signals generated by the multipliers 310–311. In an illustrative embodiment, the accumulator 316 may comprise a summing circuit (not shown) in a feedback arrangement with a latch circuit (not shown) to accumulate signals output by the multipliers 310–311 in a step-wise fashion.

To implement the weighted accumulation scheme of Equation 12 and create the second quadrature output signal, each of the latches 306–307 samples the input signal at prescribed times. Specifically, each latch 306–307 stores samples of the input signal that are to be multiplied by the multiplier 312–313 associated with that latch 306–307. In the embodiment illustrated by Equation 12, the multiplier 312 may be implemented to multiply by quadrature weighting signals of +1 and −1, and the multiplier 313 to multiply by quadrature weighting signals of +0.5 and −0.5. In this embodiment, the latch 306 will sample the intervals x2, x3, x4, x6, x7, and x8, since those sample signals must be multiplied by weighting signals of +1 or −1. The latch 307, on the other hand, samples the intervals x3 and x7, since those sample signals must be multiplied by weighting signals of +0.5 or −0.5.

These multiplication operations are easily performed with digital circuitry since multiplication by weighting signals of +1, −1, +0.5, and −0.5 can easily be performed upon binary numbers by inverting, shifting, and combinations thereof, as discussed above. In the illustrated embodiment, the multiplier 312 may comprise a selectively activated inverter, and the multiplier 313 may comprise a selectively activated shifter-inverter combination. The accumulator 317 simply sums the signals generated by the multipliers 312–313. In an illustrative embodiment, the accumulator 317 may employ similar components as the accumulator 316.

The digital PES detector 300 also includes a timing circuit 318, to orchestrate the selective sampling of signals by the latches 304–307 and the multiplication of sampled signals by the multipliers 310–313. The timing circuit 318 may comprise an arrangement of logic circuitry or a processor to selectively clock the latches 304–307 and the multipliers 310–313. The timing circuit 318 operates in accordance with a periodic clock signal received on a clock line 319. The timing circuit 318 also receives a sector marker signal on a line 320, indicating that the read/write head 106 has crossed into a servo sector. After the sector marker signal is received, the timing circuit 318 selectively clocks the latch 304 to sample intervals x1, x2, x4, x5, x6, and x8; while the latch 305 is clocked to sample intervals x1 and x5. The timing circuit 318 simultaneously manages the clocking of the latch 306 to sample intervals x2, x3, x4, x6, x7, and x8, while the latch 307 is clocked to sample intervals x3 and x7. As the sampled signals propagate through the latches 304–307, the timing circuit 316 also serves to selectively activate the multipliers 310–313 as needed to selectively shift and/or invert the sample signals, thereby achieving multiplication of the input signal by the appropriate quadrature weighting signals.

After the respective signals are sampled and multiplied by the latches 304–305 and multipliers 310–311, and the latches 306–307 and multipliers 312–313, the accumulators 316–317 produce complementary quadrature output signals. In the illustrated embodiment, the output signal of the accumulator 316 may comprise a signal representing the cosine of an operand, while the output signal of the accumulator 317 comprises a signal representing the sine of the operand.

These signals are directed to a demodulator 326, as follows. First, each output signal is individually squared by a squarer 321. In the interest of conserving circuitry, the signals from the accumulators 316–317 may be time-multiplexed in the squarer 321. In particular, a first one of the output signals may be squared while holding the second output signal in a buffer (not shown), and then the second signal may be squared while holding the first output signal in the buffer. After squaring, the squared signals are summed by an accumulator 322. Then, the square root of the summed signal is taken by square root circuitry 324. The resultant signal, an amplitude position signal, is directed to the PES decoder 129 to determine the error in the position of the read/write head 106, and then to the servo controller 130 to position the signal according to the decoded error signal. In an illustrative embodiment of the invention, the demodulator 326 may be implemented in a microprocessor, for example.

Figure 3B:
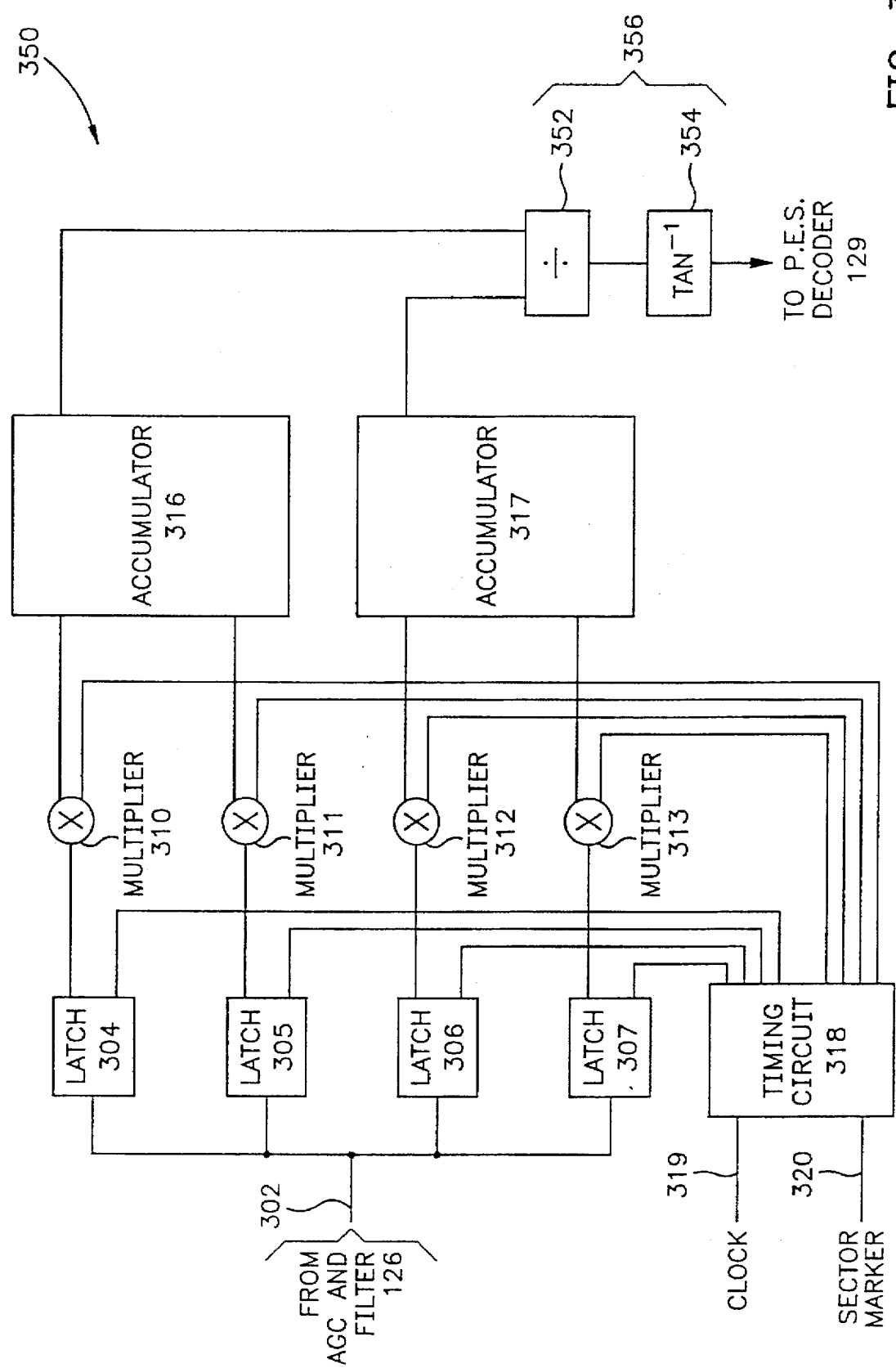

As shown in FIG. 3B, the present invention also contemplates a digital PES detector 350 to provide a phase position signal. The circuitry of the PES detector 350 largely resembles the components of the PES detector 300 (FIG. 3A). However, the demodulator 326 is replaced with a demodulator 356 that includes a divider 352 and an arctangent generator 354. Like the demodulator 326, the demodulator 356 may be implemented using a microprocessor. The divider 352 divides one quadrature output signal of the accumulators 316–317 by the other quadrature output signal, thereby providing a quotient signal. This quotient signal is directed to the arctangent generator 354, which generates a signal representative of the arctangent of the quotient signal. The resultant signal, a phase position signal, is then directed to the PES decoder 129 for further processing, as described above.

Operation

In addition to the various embodiments of the apparatus described above, the invention also contemplates several methods for processing servo signals, as shown by the exemplary steps of FIGS. 5–8.

1. ANALOG PROCESS

Figure 5:
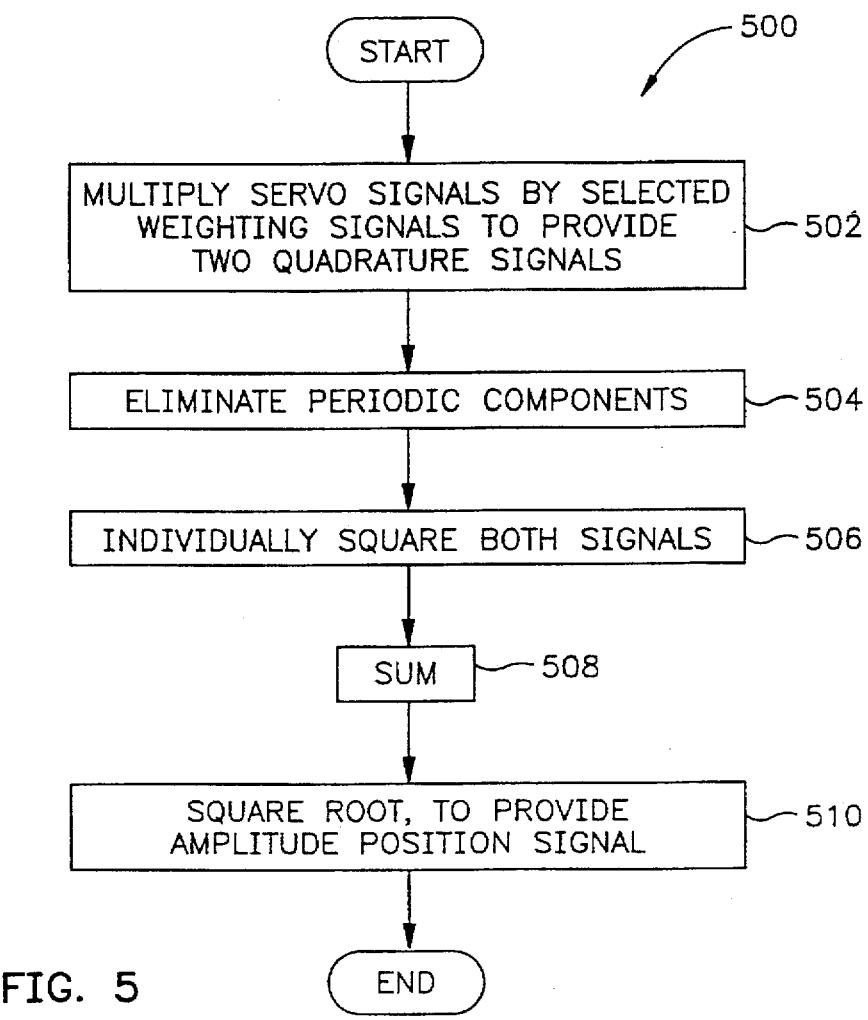
FIG. 5 illustrates a series of tasks 500 for processing amplitude servo signals using analog processing techniques, in accordance with the invention.

FIG. 5 illustrates a series of tasks 500 for generating an amplitude position signal using analog processing techniques. First, task 502 multiplies the output signal of the pre-amp 116 by selected weighting signals to provide first and second quadrature output signals. The weighting signals preferably comprise complementary quadrature weighting signals. Next, task 504 generates A.C.-cancelled output signals by eliminating any periodic components, such as A.C. signals, present in the output signals. In an illustrative embodiment, this may be achieved using a process such as integration. Then, task 506 squares each A.C.-cancelled output signal, task 508 sums the squared signals, and task 510 takes the square root of the summed signal. The resultant signal represents an amplitude position signal, which may be further processed by a decoder to yield a position error signal. The position error signal may be directed to a servo controller to adjust the read/write head's position in relation to the relevant track of data, and apply any correction that may be required.

Figure 6:
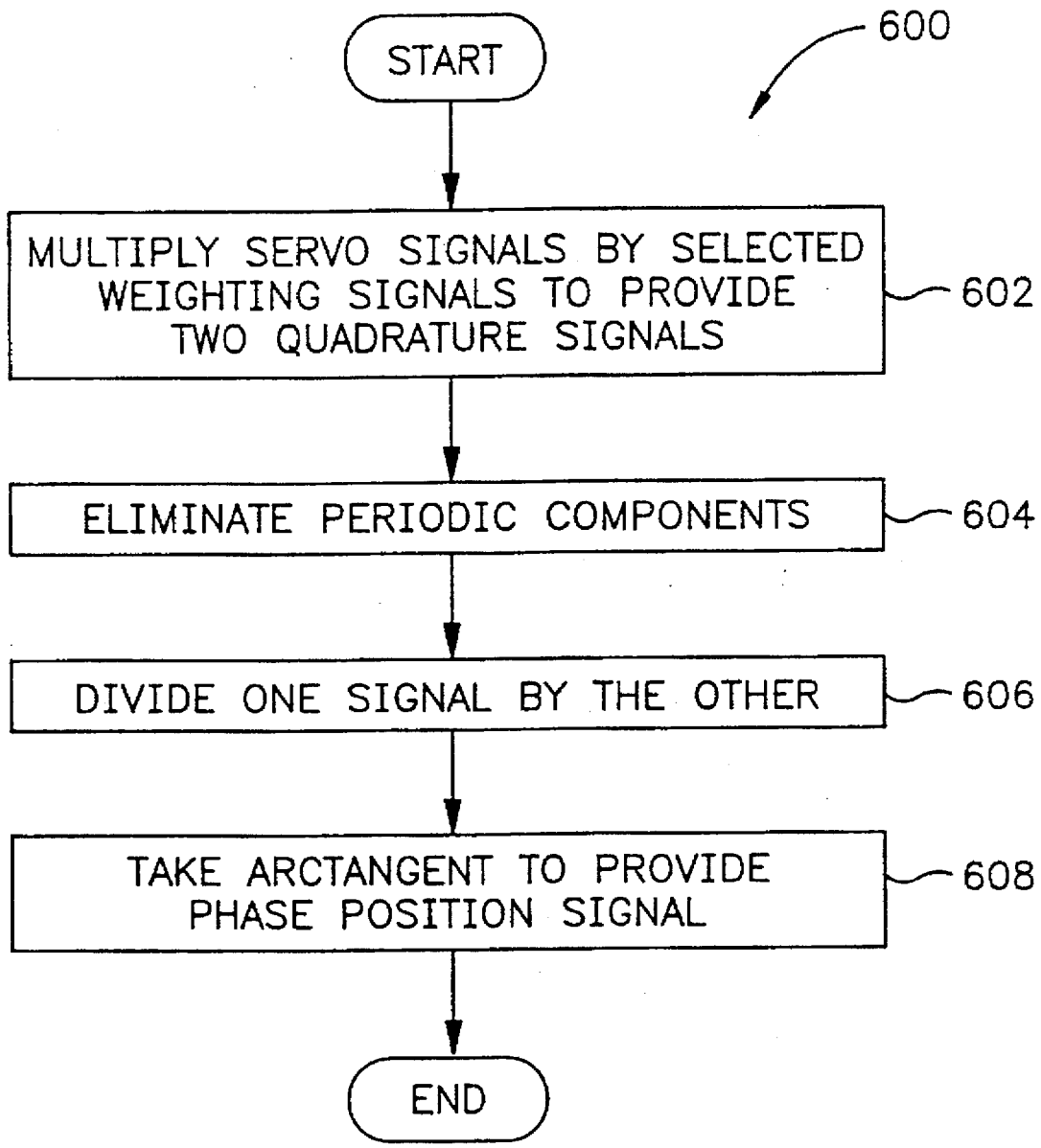
FIG. 6 illustrates a series of tasks 600 for processing phase servo signals using analog processing techniques, in accordance with the invention.

To generate a phase position signal, a different method may be applied, as illustrated by tasks 600 of FIG. 6. First, task 602 multiplies the output signal of the pre-amp 116 by selected weighting signals to provide first and second quadrature output signals. As with the embodiment of FIG. 5, the weighting signals preferably comprise complementary quadrature weighting signals. Next, task 604 generates A.C.-cancelled output signals by eliminating any periodic components, such as A.C. signals, present in the quadrature output signals. Then, task 606 divides one of these signals by the other to yield a quotient signal, and task 608 generates a signal representative of the arctangent of the quotient signal. This yields a phase position signal which, like the amplitude position signal above, may be subsequently decoded and sent to a servo controller.

2. DIGITAL PROCESS

Figure 7:
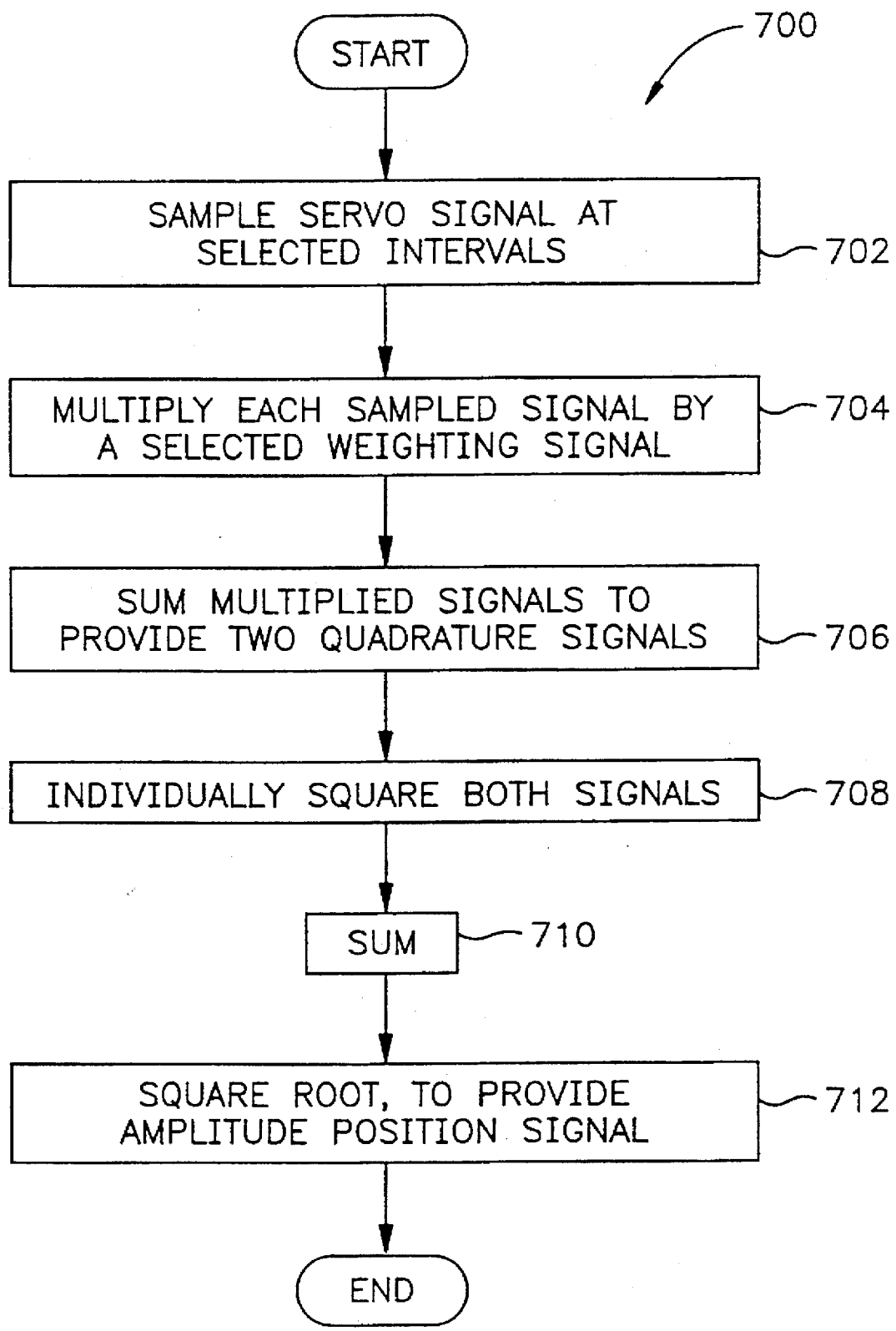
FIG. 7 illustrates a series of tasks 700 for processing amplitude servo signals using digital processing techniques, in accordance with the invention.

The invention also contemplates a method for generating amplitude or phase position signals using digital processing techniques, as shown by tasks 700 (FIG. 7). First, task 702 samples the output signal of the AGC/filter 126 at selected times. In accordance with the invention, the samples are timed to achieve frequency coherence with the servo signal. In an illustrative embodiment, eight samples are taken during each period of the servo signal, and the samples are continually taken throughout an entire servo signal corresponding to a complete servo pattern burst. The timing of the samples is coordinated by the timing circuit 318. To ensure that the timing of the eight samples is frequency coherent with the servo pattern bursts in the illustrated embodiment, the interval between adjacent samples is established to be one-seventh of the servo signals period. Task 704 selectively multiplies each one of the sampled signals by a selected one of a predetermined set of quadrature weighting signals. In the illustrated example, after eight samples have been taken to yield signals x1 through x8, the next samples to be taken are treated as x1 through x8, and multiplied by the appropriate weighting signals. Task 704 may be implemented, for example, the weighting scheme of Equations 11–12, as discussed above. In this case, the set of quadrature weighting signals would comprise +1, 31 1, +0.5, and –0.5, as discussed above. This multiplication may be accomplished by a selective combination of inverting and shifting operations, as discussed above. The inverting and shifting operations are coordinated by the timing circuit 318.

Task 706 sums the signals resulting from the above-described multiplication to create a pair of quadrature output signals. More specifically, task 706 continually sums all multiplied signals originating from samples corresponding to a single servo pattern burst. Each accumulator 316–317, then, continually accumulates multiplied signals corresponding to a given servo pattern burst, and provides a single output signal. During the next burst, the accumulators 316–317 accumulate multiplied signals to form subsequent output signals corresponding to that burst. In the illustrated embodiment, the beginning of each servo pattern burst may be known to occur at a predetermined delay after the sector marker is received. Therefore, the operation of the accumulator may be coordinated with respect to the various bursts by the timing circuit 318, since the timing circuit 318 receives the sector marker signal on the line 320. In an illustrative embodiment, the timing circuit 318 may, at the end of a burst, cause the quadrature output signals to be latched by the accumulators 316–317, and also clear the accumulators 316–317 to begin accumulating multiplied signals corresponding to a new burst.

Task 708 individually squares each quadrature output signal, task 710 sums the squared signals, and task 712 generates a signal representing the square root of the summed signal. This final signal comprises an amplitude position signal, which may be further processed by a decoder to ascertain any error in the read/write head's position, after which a servo controller may effect any corrective movement of the actuator arm 104.

Figure 8:
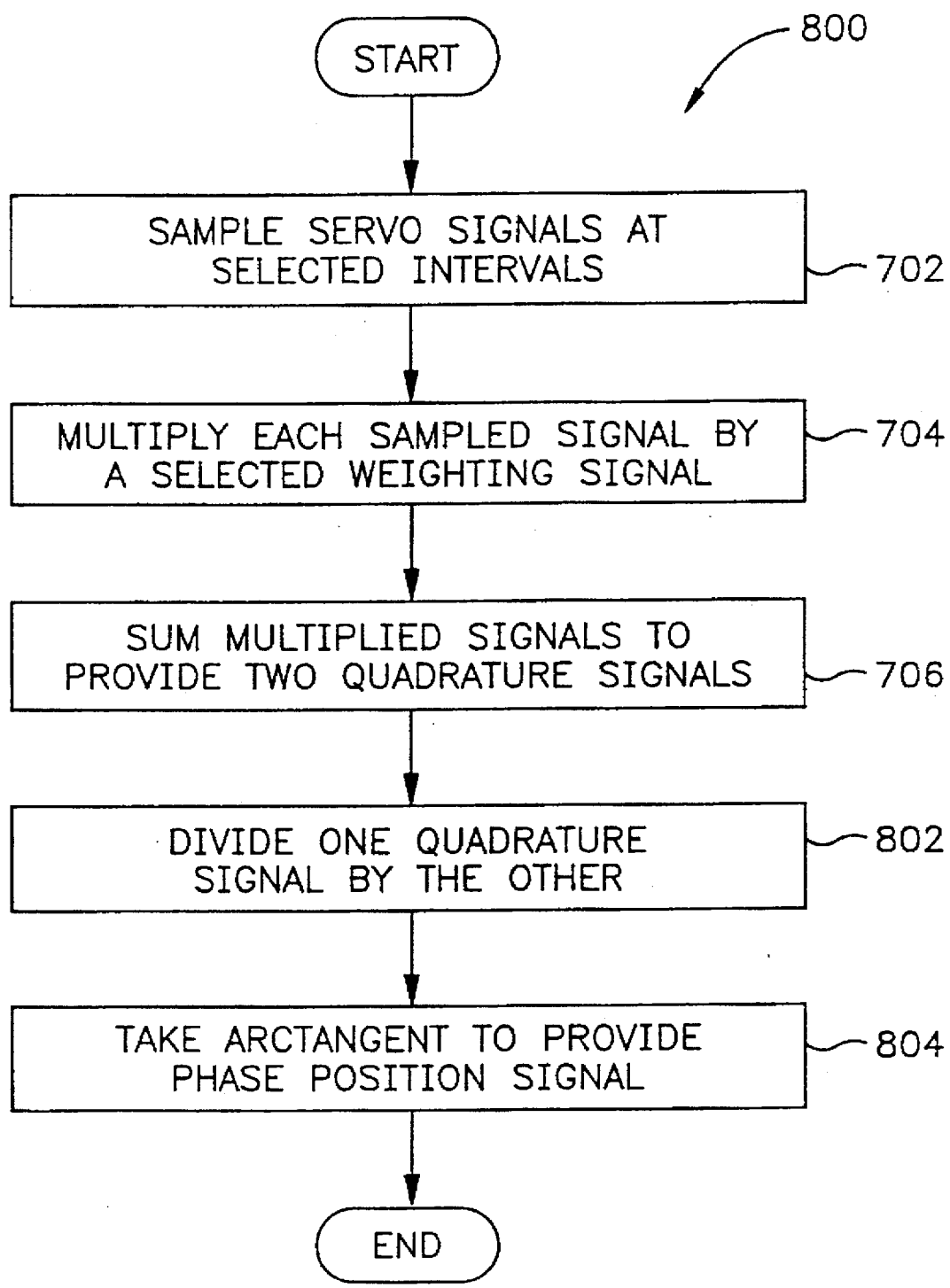
FIG. 8 illustrates a series of tasks 800 for processing phase servo signals using digital processing techniques, in accordance with the invention.

To generate a phase position signal, a different method may be applied, as illustrated by tasks 800 of FIG. 8. Tasks 702, 704, and 706 are performed in the same manner as the method of FIG. 7. However, in the method of FIG. 8, the quadrature output signals provided by task 706 are processed differently. Specifically, task 802 divides one quadrature output signal by the other to yield a quotient signal. Then, task 804 generates a signal representing the arctangent of the quotient signal of task 802. The signal generated by task 804 comprises a phase position signal, which may be further processed as described above.

Testing

Figure 9:
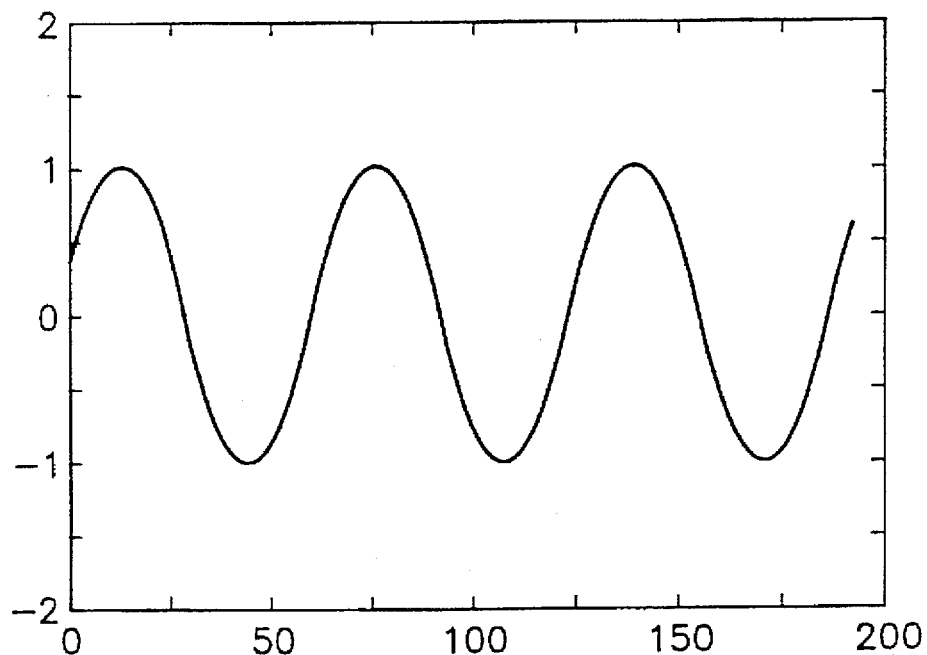
FIG. 9 is a graph that depicts a noiseless servo signal, used in testing the present invention.
Figure 10:
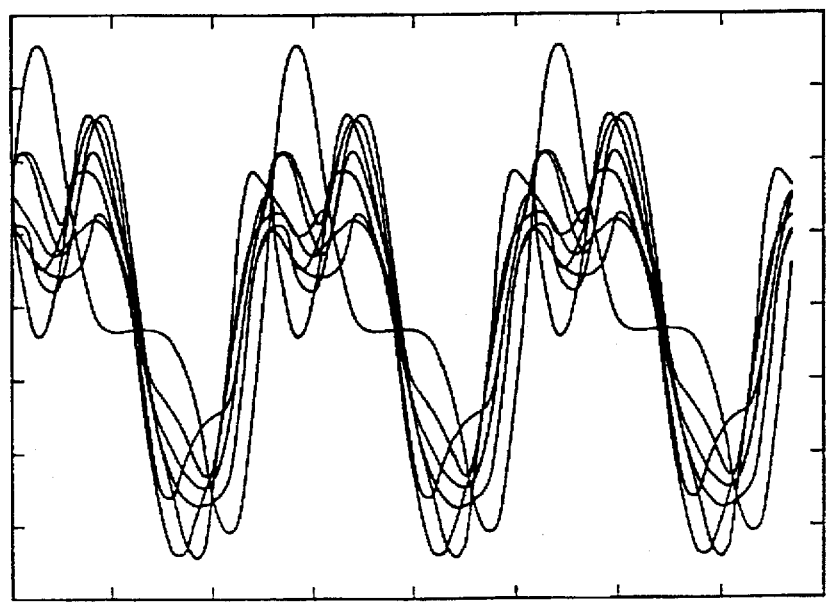
FIG. 10 is a graph that depicts a servo signal distorted with noise, for use in testing the present invention.

To test the performance of certain embodiments of the present invention, exemplary embodiments of the present invention and a conventional servo detector were constructed using computer simulation. This simulation was performed using an IBM personal computer with an Intel 80486 microprocessor and a mathematics co-processor. The computer was programmed to simulate the digital amplitude and phase PES detectors 300, 350 of the invention, and to simulate a known zero-crossing detector. To test these models, a noisy signal was generated as follows. First, a noiseless input signal (FIG. 9) was generated, to represent a typical amplitude or phase servo signal. Then, some white noise along with first, second, and third order harmonic signals were added to the noiseless input signal to create a noisy input signal (FIG. 10).

1. AMPLITUDE PES DETECTION

Figure 11:
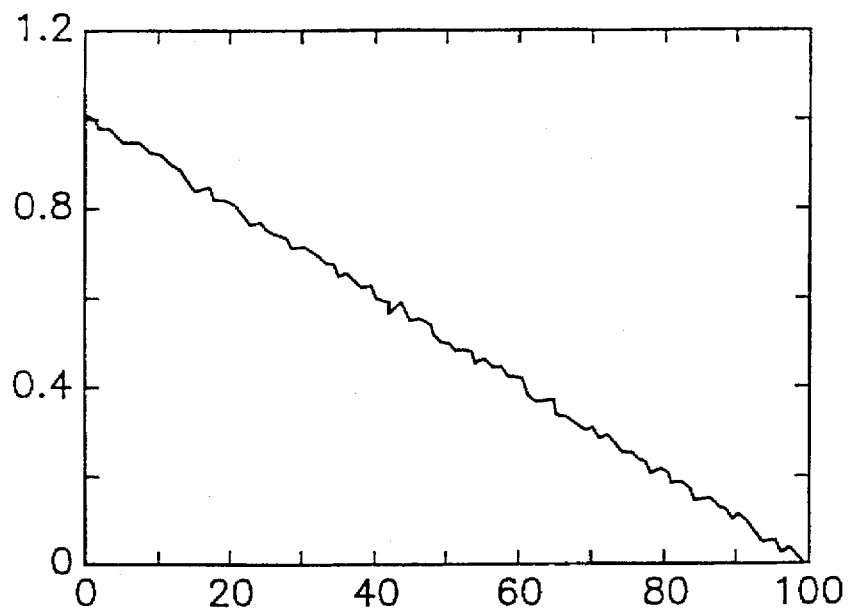
FIG. 11 is a graph that depicts a noise-reduced amplitude position signal generated in accordance with the present invention.

In one test, the computer model of the digital amplitude PES detector 300 was examined. In response to the noisy input signal, the PES detector 300 provided the amplitude position signal illustrated in FIG. 11. In FIG. 11, the horizontal axis represents time and the vertical axis represents a scaled amplitude. The signal of FIG. 11 illustrates the decrease in amplitude that occurs as the read/write head 106 moves away from a servo burst.

Figure 12:
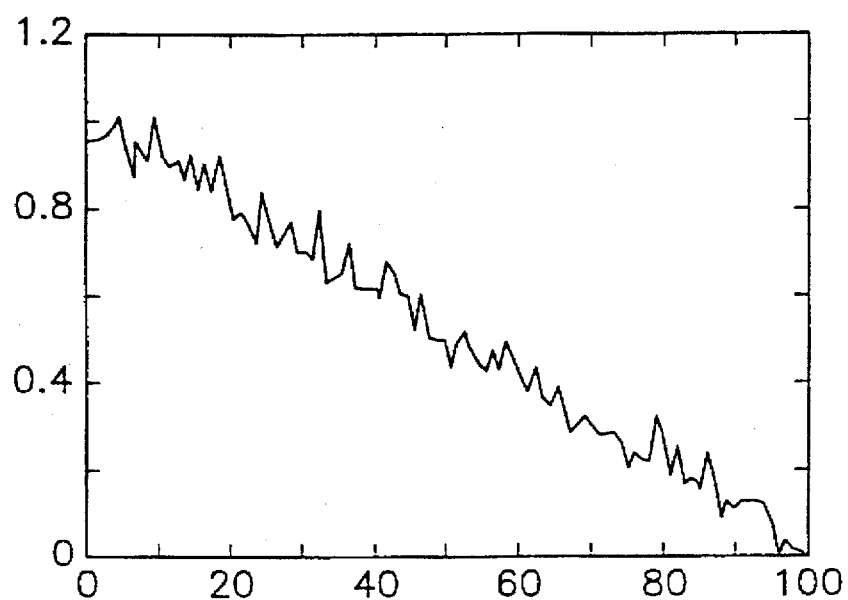
FIG. 12 is a graph that depicts a noisy amplitude position signal generated by a conventional "zero-crossing" servo detector.

As shown in FIG. 11, the amplitude position signal produced by the invention contained very little noise. In contrast, the amplitude position signal produced by the simulated zero-crossing detector contained more noise, as shown in FIG. 12.

2. PHASE PES DETECTION

Figure 13:
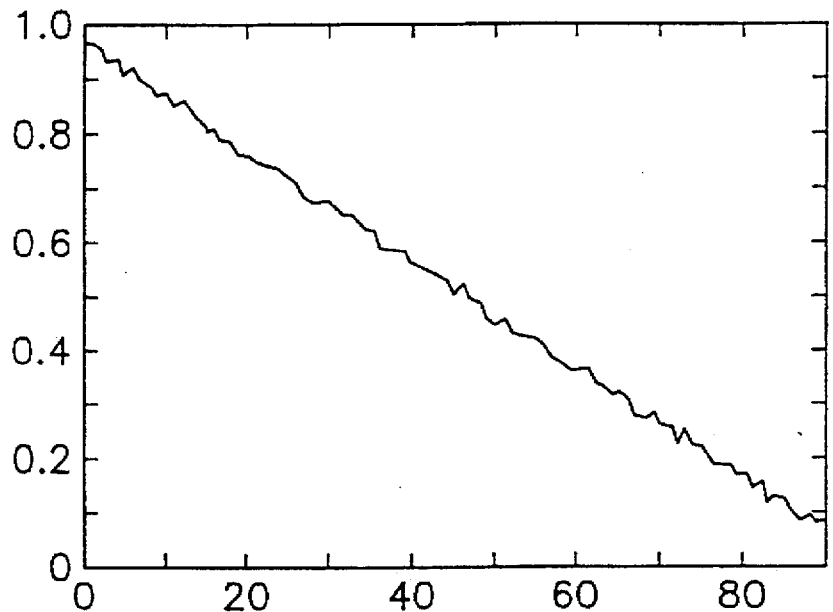
FIG. 13 is a graph that depicts a noise-reduced phase position signal generated in accordance with the present invention.

In another test, the computer model of the digital phase PES detector 350 was examined. In response to the noisy input signal, the detector 350 provided the phase position signal illustrated in FIG. 13. In FIG. 13, the horizontal axis represents time and the vertical axis represents a scaled phase. The signal of FIG. 13 illustrates the decrease in phase that occurs as the read/write head 106 moves from a servo burst of a first phase to a servo burst of a second, lesser, phase.

Figure 14:
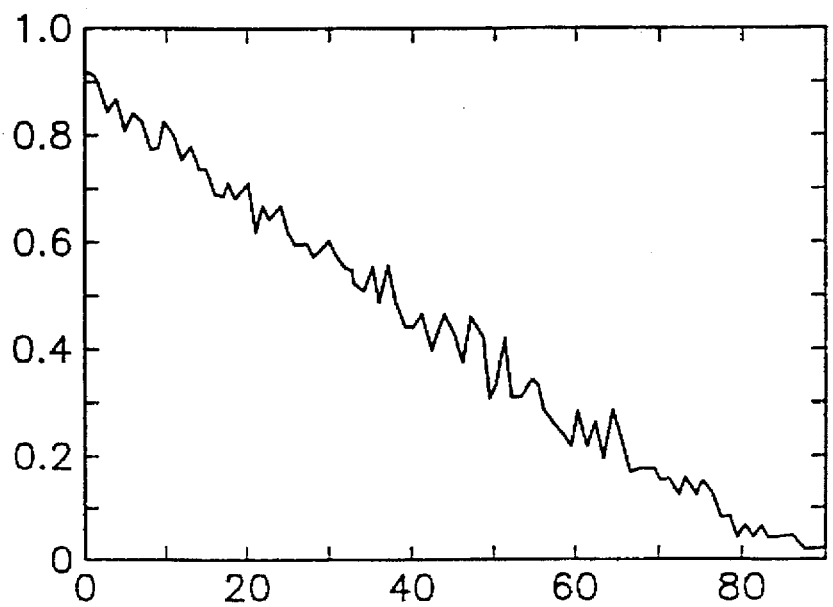
FIG. 14 is a graph that depicts a noisy phase position signal generated by a conventional "rectifying" servo detector.

As indicated by FIG. 13, then, the phase position signal produced by the invention contained very little noise. In contrast, the phase position signal of the conventional zero-crossing detector contained more noise, as shown in FIG. 14.

What is claimed is:

1. A position detecting system to asynchronously generate position signals indicative of a read/write head's position with respect to servo tracks contained on a rigid magnetic disk, in a system where amplitude servo patterns proximate said servo tracks are detected and amplified to yield an amplitude servo signal, said position detecting system comprising:

weighting circuitry for multiplying the amplitude servo signal by predetermined complementary quadrature weighting signals to produce first and second quadrature output signals; and demodulation circuitry electrically connected to the weighting circuitry to combine the first and second quadrature output signals to provide an amplitude position signal corresponding to the read/write head's position with respect to a selected one of the servo tracks.

2. The position detecting system of claim 1, wherein the amplitude servo signal comprises an analog signal, the quadrature weighting signals comprise analog signals, and the weighting circuitry comprises multipliers for multiplying the analog amplitude servo signal by the analog weighting signals.

3. The position detecting system of claim 2, wherein the weighting signals comprise sine and cosine signals.

4. The position detecting system of claim 2, wherein the weighting signals comprise periodic signals of substantially identical shape that differ in phase by 90 degrees.

5. The position detecting system of claim 1, further comprising an amplifier electrically connected to the weighting circuitry to generate the servo signal by amplifying signals from the read/write head.

6. The position detecting system of claim 5, further comprising an automatic gain control circuit electrically connected between the amplifier and the weighting circuitry.

7. The position detecting system of claim 5, further comprising a filter electrically connected between the amplifier and the weighting circuitry.

8. The position detecting system of claim 5, further comprising an analog-to-digital converter electrically connected between the amplifier and the weighting circuitry.

9. The position detecting system of claim 5, further comprising a read/write head to sense servo patterns contained on rigid magnetic disks, where said read/write head is electrically connected to the amplifier.

10. The position detecting system of claim 1, wherein the servo signal comprises a digital signal and the weighting circuitry comprises:

latches to sample the servo signal at predetermined times, thereby creating sampled signals;

multipliers, electrically connected to the latches, to selectively multiply the sampled signals by first and second predetermined complementary quadrature weighting signals; and accumulators, electrically connected to the multipliers, to sum signals provided by the multipliers.

11. The position detecting system of claim 10, wherein each multiplier comprises at least one of the following components: a binary shifter or a binary inverter.

12. The position detecting system of claim 1, wherein the servo signal comprises a digital signal and the weighting circuitry comprises:

a first set of latches to selectively sample the servo signal at predetermined times to create a first group of sampled signals;

a second set of latches to selectively sample the servo signal at predetermined times to create a second group of sampled signals;

a first set of multipliers, electrically connected to the first set of latches, to selectively multiply each signal of the first group by one signal of a first set of predetermined quadrature weighting signals;

a second set of multipliers, electrically connected to the second set of latches, to selectively multiply each signal of the second group by one signal of a second set of predetermined quadrature weighting signals;

a first accumulator, electrically connected to the first set of multipliers, to generate a first quadrature output signal by summing signals provided by the first set of multipliers; and a second accumulator, electrically connected to the second set of multipliers, to generate a second quadrature output signal by summing signals provided by the second set of multipliers.

13. The position detecting system of claim 12, further comprising a timing circuit, electrically connected to the latches, to establish the predetermined times at which the first and second set of latches selectively sample the servo signal.

14. The position detecting system of claim 12, further comprising a timing circuit, electrically connected to the multipliers, to establish the quadrature weighting signals by selectively activating components of the multipliers.

15. The position detecting system of claim 1, wherein the servo pattern is contained on selected regions of the rigid magnetic disk in accordance with a sector servo arrangement.

16. The position detecting system of claim 1, wherein the servo pattern is contained on at least one side of the rigid magnetic disk in accordance with a dedicated surface servo arrangement.

17. A position detecting system to asynchronously generate position signals indicative of a read/write head's position with respect to servo tracks contained on a rigid magnetic disk, in a system where servo patterns proximate said servo tracks are detected and amplified to yield a servo signal, said position detecting system comprising:

weighting circuitry for multiplying the servo signal by predetermined complementary quadrature weighting signals to produce first and second quadrature output signals; and demodulation circuitry electrically connected to the weighting circuitry to combine the first and second quadrature output signals to provide an amplitude position signal corresponding to the read/write head's position with respect to a selected one of the servo tracks, said demodulation circuitry comprising:

a squarer to square the first and second quadrature output signals, respectively, thereby providing first and second squared signals;

summing circuitry electrically connected to the squarer to sum the squared signals, thereby providing a summed signal; and square root circuitry electrically connected to the summing circuitry to produce a signal representative of the square root of the summed signal.

18. The position detecting system of claim 17, wherein the servo signal comprises an analog signal and the position detecting system further includes A.C. cancellation circuitry to remove any periodic signals from the first and second quadrature output signals.

19. The position detecting system of claim 18, wherein the A.C. cancellation circuitry comprises an integrator.

20. The position detecting system of claim 17, wherein the servo signal comprises an analog signal and the squarer comprises an arrangement of at least one nonlinear semiconductor device.

21. The position detecting system of claim 20, wherein the nonlinear semiconductor device includes at least one transistor.

22. The position detecting system of claim 20, wherein the nonlinear semiconductor device includes at least one diode.

23. The position detecting system of claim 17, wherein the servo signal comprises an analog signal and the square root circuitry comprises an arrangement of at least one nonlinear semiconductor device.

24. The position detecting system of claim 23, wherein the nonlinear semiconductor device includes at least one transistor.

25. The position detecting system of claim 23, wherein the nonlinear semiconductor device includes at least one diode.

26. The position detecting system of claim 17, further comprising an amplifier electrically connected to the weighting circuitry to generate the servo signal by amplifying signals from the read/write head.

27. The position detecting system of claim 17, wherein the servo pattern is contained on selected regions of the rigid magnetic disk in accordance with a sector servo arrangement.

28. The position detecting system of claim 17, wherein the servo pattern is contained on at least one side of the rigid magnetic disk in accordance with a dedicated surface servo arrangement.

29. A rigid disk drive system, comprising:
- at least one rigid magnetic disk containing multiple data sectors as well as multiple amplitude servo patterns corresponding to servo tracks also contained on said at least one disk;
- a read/write head to detect the servo patterns and provide a servo signal;
- a data channel electrically connected to the read/write head to read and write customer data to and from the data sectors of the at least one disk; and
- a position detecting system to asynchronously generate amplitude position signals indicative of the read/write head's position with respect to the servo tracks, said position detecting system comprising:
  weighting circuitry electrically connected to the read/write head for multiplying the amplitude servo signal by predetermined complementary quadrature weighting signals to produce first and second quadrature output signals; and
  demodulation circuitry electrically connected to the weighting circuitry to combine the first and second quadrature output signals to provide an amplitude position signal corresponding to the read/write head's position with respect to a selected one of the servo tracks.

30. In a disk drive controller including at least one rigid magnetic disk that includes at least one surface containing servo tracks and amplitude servo patterns, where said disk drive controller also includes a read/write head to detect the amplitude servo patterns and create a corresponding analog amplitude servo signal, a position detecting system to asynchronously generate analog amplitude position signals indicative of the read/write head's position with respect to selected ones of the servo tracks, said position detecting system comprising:
  weighting circuitry electrically connected to the read/write head for multiplying the analog amplitude servo signal by predetermined complementary quadrature weighting signals to produce first and second analog quadrature output signals; and
  demodulation circuitry electrically connected to the weighting circuitry to combine the first and second quadrature output signals to provide an analog amplitude position signal corresponding to the read/write head's position with respect to the selected one of the servo tracks.

31. A position detecting system to asynchronously generate position signals indicative of a read/write head's position with respect to servo tracks contained on a rigid magnetic disk, where said system receives an analog amplitude servo signal generated by detecting and amplifying amplitude servo patterns proximate said servo tracks, said analog amplitude servo signal being substantially represented by $$A \cos (t+\theta),$$

wherein A is an amplitude of the servo signal, t is time, and $\theta$ is a constant phase, said position detecting system comprising:
  weighting circuitry for multiplying the analog amplitude servo signal by first and second complementary quadrature weighting signals to produce first and second quadrature output signals, said first quadrature weighting signal being substantially represented by $$2K \sin (t),$$

where K is a constant scaling factor, said second quadrature weighting signal being substantially represented by $$2K \cos (t),$$

the first quadrature output signal substantially represented by $$-KA \sin(\theta) + KA (\sin(2t+\theta)),$$

said second quadrature output signal substantially represented by $$-KA \cos(2t+\theta) + KA \cos (\theta);$$

A.C. cancellation circuitry to eliminate time-variant components of the first and second quadrature output signals to provide first and second D.C. quadrature signals substantially represented by $-KA (\sin(\theta))$ and $KA \cos(\theta)$, respectively;
  demodulation circuitry electrically connected to the A.C. cancellation circuitry to combine the first and second D.C. quadrature output signals to provide an analog amplitude position signal representative of the read/write head's position with respect to a selected one of the servo tracks.

\* \* \* \* \*